Patented July 6, 1926.

1,591,397

UNITED STATES PATENT OFFICE.

CHARLES NESS, OF INDIANAPOLIS, INDIANA, ASSIGNOR TO THE PREST-O-LITE COMPANY, INC., A CORPORATION OF NEW YORK.

FILLING MASS FOR CONTAINERS FOR EXPLOSIVE GASES.

No Drawing.   Application filed August 24, 1925. Serial No. 52,225.

This invention relates to porous materials suitable for use as a filling mass for receptacles used in the storage of gases under pressure and to processes of preparing such materials.

One of the principal objects of the invention is to provide an improved filling mass for receptacles intended for the storage and transportation of explosive gases, particularly acetylene dissolved in a solvent such as acetone.

A further object of the invention is to provide a filling mass which may be forced in a plastic condition through a small orifice into a storage receptacle so as to completely fill the same, and which, on standing, sets or hardens to form a porous mass free from cavities or voids large enough to permit of the spreading of any local decomposition of the acetylene to the remainder of the gas.

According to a preferred embodiment of the invention plaster of Paris, water and acetone are mixed to form a mass of suitable consistency for working, and, while in a plastic condition, the mixture is introduced into the storage receptacle, which may be for example, a steel cylinder of the kind commonly employed in storing and transporting dissolved acetylene. Only sufficient water to chemically combine with the plaster of Paris is used. If desired the setting time of the mass may be accelerated by dissolving alum or the like in the water used. A small proportion of asbestos fibre may also be added to the mixture to increase the strength of the resulting filling mass.

The proportion of acetone used in the mixture may be varied within a rather wide range according to the requirements as to plasticity during introduction into the cylinder and the degree of porosity desired in the resulting filling material. While a mixture of plaster of Paris and water without acetone may be used, the porosity of such mixture is lower than that of a similar mixture containing acetone.

A mixture resulting in a final firm product and exhibiting a porosity not exceeding the accepted limit of 80% comprises the above mentioned materials in the following proportions:

| | Pounds. |
|---|---|
| Plaster of Paris | 64 |
| Asbestos | 12 |
| Water (saturated with alum) | 13 |
| Acetone | 64 |

This mixture has sufficient fluidity so it can be forced into a cylinder by a pressure nozzle or "gun" and will penetrate to all portions of the cylinder. The material upon setting or hardening will form a coherent porous mass substantially completely filling the cylinder.

The filling material may also include one or more other ingredients, for example such porous materials as kieselguhr, charcoal, kapok, corn pith, balsa wood, etc.

Instead of causing the mass to set in situ it may be formed into blocks in suitable molds and the blocks after setting may be packed in a storage tank in the same manner as porous blocks have heretofore been packed in such vessels. However, I prefer to form the mass directly in the acetylene storage tank or the like as this is simpler and insures complete freedom from objectionable cavities.

I claim:

1. As a filling mass for receptacles for storing explosive gases the product resulting from the setting of a mixture comprising plaster of Paris, water and acetone.

2. As a filling mass for receptacles for storing explosive gases the product resulting from the setting of a mixture comprising plaster of Paris, water, acetone and a porous material.

3. As a filling mass for receptacles for storing explosive gases, the product resulting from the setting of a mixture comprising plaster of Paris, water, acetone and asbestos.

4. The method of producing a porous mass of the character described, which consists in mixing plaster of Paris, water and acetone and allowing the resulting mass to set or harden.

5. A method of preparing a container for dissolved acetylene, comprising placing in such container a mixture of plaster of Paris, water and acetone, and allowing the mixture to set or harden, whereby a rigid mass substantially free from objectionable cavities and substantially completely filling said container is obtained.

In testimony whereof, I affix my signature.

CHARLES NESS.